United States Patent
Norrish et al.

(10) Patent No.: US 6,512,200 B2
(45) Date of Patent: Jan. 28, 2003

(54) WELDING CONTROL SYSTEM

(75) Inventors: John Norrish, Bulli (AU); Christopher David Cook, Wombarra (AU); Dominic Cuiuri, Cordeaux Heights (AU); Gary Dean, Albion Park (AU)

(73) Assignees: CRC for Welded Structures, Limited, Wollongong (AU); Comweld Group, Pty. Ltd., Preston (AU)

( * ) Notice: Subject to any disclaimer, the term of this patent is extended or adjusted under 35 U.S.C. 154(b) by 0 days.

(21) Appl. No.: 09/771,193

(22) Filed: Jan. 26, 2001

(65) Prior Publication Data

US 2002/0008095 A1 Jan. 24, 2002

(30) Foreign Application Priority Data

Jan. 27, 2000 (AU) .............................. PQ5284

(51) Int. Cl.$^7$ ................................ B23K 9/10
(52) U.S. Cl. .................. 219/137 PS; 219/130.21; 219/130.33
(58) Field of Search ............. 219/130.21, 130.01, 219/130.31, 130.32, 130.33, 137 PS

(56) References Cited

U.S. PATENT DOCUMENTS

| 3,792,225 A | 2/1974 | Needham et al. ....... 219/131 R |
| 3,809,853 A | 5/1974 | Manz ....................... 219/137 |
| 4,020,320 A | 4/1977 | Pijls et al. ............. 219/137 PS |
| 4,544,826 A | 10/1985 | Nakanishi et al. ..... 219/137 PS |
| 4,546,234 A | 10/1985 | Ogasawara et al. .... 219/137 PS |
| 4,717,807 A | 1/1988 | Parks et al. ........... 219/130.21 |
| 4,835,360 A | 5/1989 | Parks et al. ............ 219/137 PS |
| 4,866,247 A | 9/1989 | Parks et al. ............ 219/137 PS |
| 4,897,523 A | 1/1990 | Parks et al. ............ 219/137 PS |
| 4,954,691 A | 9/1990 | Parks et al. ............ 219/137 PS |
| 4,972,064 A | 11/1990 | Stava .................... 219/130.21 |
| 5,001,326 A | 3/1991 | Stava .................... 219/137 PS |
| 5,003,154 A | 3/1991 | Parks et al. ............ 219/137 PS |
| 5,148,001 A | 9/1992 | Stava .................... 219/137 PS |
| 5,272,314 A | 12/1993 | Moriguchi et al. ..... 219/130.33 |
| 5,306,894 A | 4/1994 | Moriguchi et al. ..... 219/130.31 |
| 6,031,203 A * | 2/2000 | Suzuki et al. .......... 219/130.01 |
| 6,087,626 A * | 7/2000 | Hutchison et al. ..... 219/130.21 |

* cited by examiner

Primary Examiner—Clifford C. Shaw
(74) Attorney, Agent, or Firm—Wolf, Greenfield & Sacks, P.C.

(57) ABSTRACT

A system 11 for controlling an arc welding system 10 operating in a dip transfer mode is disclosed. The control system is operative to control the current output from a power source so as to apply a current pulse during the arcing phase of the welding system which is operative to form a molten droplet on the electrode of the welding torch 13 which is within a predetermined threshold size range, The control system 11 is then operative to clamp the current output from the power source 12 so that bridge rupturing occurs at relatively low current levels to thereby significantly reduce spatter during bridge rupturing.

43 Claims, 3 Drawing Sheets

WELDING CONTROL SYSTEM

CROSS REFERENCE TO RELATED APPLICATIONS

This application claims priority to Australian application Ser. No. PQ5284 filed Jan. 27, 2000, the disclosure of which is incorporated herein by reference in its entirty.

FIELD OF INVENTION

The present invention relates generally to welding and more specifically to a control system for use in arc welding operating in the short circuit (or dip) transfer mode.

BACKGROUND OF THE INVENTION

In a typical arc welding system operating in the dip transfer mode, a welding circuit is established which includes a consumable electrode, a workpiece and a power source, The electrode is generally a solid wire and not only conducts the electric current and sustains the arc, but also melts and supplies filler material into the joint. A shielding gas such as carbon dioxide or blends of argon with carbon dioxide and/or oxygen may be supplied during the welding process to support the arc and prevent the molten metal reacting with oxygen and nitrogen in ambient air.

During the arcing phase of the welding cycle, a molten metal droplet forms on the end of the electrode. As the electrode is advanced from the contact tip, the metal droplet engages the molten metal pool formed in the workpiece creating a short circuit. The arc is actually quenched at this point and the current rises at a rate determined by the power source characteristics. The increase in current causes an electromagnetic pinch force to be applied to the molten droplet material that forms a bridge between the electrode and the workpiece. The applied pinch force assists in the promotion of the bridge rupturing, so that molten material is transferred to the workpiece and the arc is re-established. However, the high current at the time of rupture often causes the bridge to rupture with an explosive force, thereby resulting in welding spatter. Spatter is undesirable in the welding process as it diminishes the weld quality and results in additional cleaning of the weld site, thereby increasing both the cost and time of production of the weld.

Sophisticated power sources have been developed with spatter control systems which minimise the spatter by ensuring the current is turned off immediately before an impending bridge rupture is detected. However, these control systems are not widely applicable as the majority of power sources are not capable of switching the current off fast enough prior to rupturing occurring.

SUMMARY OF THE INVENTION

An aim of the present invention is to provide a control method and system for use in welding which can reduce spatter and which is able to be used with conventional power supplies, A further aim of the invention is to provide a welding power supply incorporating this improved control method and system.

In a first aspect, the invention provides a method of controlling an arc welding system operating in the dip transfer mode, the welding system including a power source and a consumable electrode which in operation is operative to be advanced into contact with a workpiece, the welding system being operative to create a welding circuit which is energised by said power source and which has a welding cycle comprising an arcing phase where the electrode is spaced from said workpiece and an arc is generated across said space, the arc being operative to form a molten droplet on the end of the electrode, and a short circuit phase where the electrode is in contact with said workpiece, the welding cycle changing from the arcing phase to the short circuit phase on contact of the molten droplet with the workpiece, and changing from the short circuit phase to the arcing phase after rupturing of a bridge of molten material formed between said electrode and said workpiece, the method including the steps of:

(i) conditioning the welding system to form a molten droplet on the electrode end during the arcing phase which is above a predetermined threshold size so that bridge rupturing can occur during the short circuit phase without requiring high current during the short circuit, and (ii) controlling the current output from the power source during the short circuit phase.

In a second aspect, the invention provides a system for controlling an arc welding system operating in the dip transfer mode, the welding system including a power source and a consumable electrode which in use is operative to be advanced into contact with a workpiece, the welding system being operative to create a welding circuit which is energised by said power source and which has a welding cycle comprising an arcing phase where the electrode is spaced from said workpiece and an arc is generated across said space, the arc being operative to form a molten droplet on the end of the electrode, and a short circuit phase where the electrode is in contact with said workpiece, the welding cycle changing from the arcing phase to the short circuit phase on contact of the molten droplet with the workpiece, and changing from the short circuit phase to the arcing phase after rupturing of a bridge of molten material formed between said electrode and said workpiece, the control systems including:

(i) conditioning means operative to condition the welding system to form a molten droplet on the electrode end during the arcing phase which is within a predetermined threshold size range so that bridge rupturing can occur during the short circuit phase without requiring high current during the short circuit, and (ii) current control means operative to control the current output from the power source during the short circuit phase, In accordance with the present invention, the control system uses the size of the droplet to obviate the need for a high current to initiate bridge rupturing. In the present system, because of the size of the droplet, rupturing is able to result primarily from the surface tension at the droplet-pool interface. Therefore, with the control system, the current is able to be maintained at a relatively low level throughout the short circuit phase. In this regard, it has been found that utilising the systems and methods of the invention, bridge rupturing can occur using current levels of 30–40% of the natural short circuiting current. As the natural short circuiting current is typically in the vicinity of 350 amps, using the present invention bridge rupturing may occur in the vicinity of 150 amps.

A control system according to the present invention is therefore able to significantly reduce spatter. Further, the system has the substantial benefit over existing spatter control systems as it does not require fast "turn-off" of the current prior to bridge rupture to reduce spatter and is therefore capable of being used on a wide range of power sources.

The molten droplet formed during the arcing phase should not be excessively big as this can lead to process instability.

In particular, if the droplet is too big during the arcing phase, it may shift from a central position on the electrode tip which will adversely affect its positioning in the contact area of the workpiece and may also lead to localised arcs forming particularly when $CO_2$ shielding gas is used. Further, if the droplet is too big, it may separate prematurely from the electrode.

In a preferred form, the control system is operative to condition the welding system to produce a molten droplet within the threshold size range by applying a current pulse during the arcing phase. This current pulse is specifically designed to increase the size of the molten droplet but is less than required to cause detachment of the droplet from the electrode. Preferably following the current pulse, the current is maintained during the arcing phase at a level which will produce the required heat input to ensure that the droplet remains molten and workpiece plate fusion occurs.

Preferably during the short circuit phase, the current is maintained or clamped below a predetermined level. If required, the current may be reduced after the short circuit is detected to assist the wetting in of the molten droplet. Once the wetting in period is completed, the current may then be increased to its clamp level where it is held until the bridge ruptures. After detecting the rupture, the welding process enters the subsequent arcing phase where the current pulse is again applied to grow the droplet to its threshold size.

The size of the molten droplet formed during the arcing phase will determine the level of current, if any, that is required to cause bridge rupturing during the short circuit phase. Accordingly, the value of the threshold size of the droplet will determine the amount of current that is required. It is to be appreciated that both the threshold size of the droplet and the current level during the short circuit phase may vary within a considerable range whilst still achieving the prime objective of the invention to minimise spatter.

In one form, the control system is able to control the droplet size prior to short circuit to ensure that it reaches an optimum level, The size of-the molten droplet is determined or estimated in real time during the welding cycle, In this way, the control system is able to determine when the droplet has reached its threshold level. The advantage of this arrangement is that the parameters established by the control system to condition the welding process to form the droplet may be appropriately set to optimise droplet growth in the arcing phase to produce a quality weld.

Alternative methods exist for the real time estimation of droplet size.

One method of droplet size estimation requires firstly that that the contact tip to workpiece distance (CTWD) is estimated. This is done by measuring the minimum short circuit resistance during the short circuit, the duration of the short circuit, and applying two correction factors to estimate CTWD:

$$CTWD = aR_{sc\_min} \times \frac{b}{T_{sc}} \quad \text{Units:meters}$$

where b is the time-dependent correction factor, and a is the resistance-dependent correction factor. The transit time, which is the time taken for an element of material in the electrode to travel from contact tip to workpiece, can then be calculated as:

$$T_{transit} = \frac{CTWD}{\text{Wire Feed Speed}} \quad \text{Units:seconds}$$

The amount of electrode preheating, which affects the rate at which material at the electrode tip melts, can then be estimated using the action integral:

$$\text{Action} = \int_{t-T_{transit}}^{t} i^2(t)dt \quad \text{Units:AAs}$$

where t is the present time. The instantaneous melting rate of the electrode is then, $$MR(t) = \frac{\alpha}{1 - \beta \times \text{Action}} \quad \text{Units:meters/sec}$$

where $\alpha$ and $\beta$ are the arcing and resistive melting rate constants of the electrode being used, Integrating the melting rate over the duration of the arcing period calculates the length of electrode L(t) which has been molten during the arcing:

$$\Delta L(t) = \int_{t=\text{start of arc}}^{t} MR(t)dt \quad \text{Units:meters}$$

The final step is to estimate the droplet diameter by converting the cylindrical element of electrode of length L into a sphere of diameter $d_s$.

The above method of estimating droplet size as it is being formed allows the control system to terminate conditioning of the welding system, such as terminating the arcing current, when a target size has been reached.

An alternative method of droplet size estimation is to simply measure the elapsed time of each weld cycle and estimate the droplet size assuming the wire feed rate remains exactly constant:

$$\Delta L_{avg} = \text{Wire Feed Speed} \times T_{cycle} \quad \text{Units: meters}$$

An average of several values may need to be taken to obtain a reliable estimate. Unlike the more complex method, the size can be estimated only after the short circuit has started (ie at the end of droplet formation), No pre-emptive action can be taken by the controller to limit droplet size.

Once the droplet size is estimated by either method, the controller can compensate for insufficient droplet size by changing the conditioning parameters such as increasing the steady-state arcing current in the subsequent cycle, in order to ensure that a suitable size is achieved before the next short circuit. Alternatively, if the droplet size is excessive, the steady state arcing current can be reduced so that the short circuit frequency is increased. This makes the process more appealing to a manual operator.

In another form, the control system does not measure the droplet size, but rather an estimate is initially made as to what conditioning of the system is required to suit the welding process parameters to produce a droplet of appropriate size.

In this arrangement, preferably the control system provides feedback information as to whether an appropriate weld has been made in any cycle. This information enables the conditioning of the system in the arc phase to be varied or the short circuit current level to be altered in subsequent cycles if an appropriate weld is not formed in any cycle. In this way, the system is adaptive and able to optimise the control system parameters.

In one form, the feedback information may be the duration of the short circuit phase, If the short circuit falls outside a specified range (that is, if it is too short, or too long), the conditioning parameters during the arcing phase, or the short circuit current, may be appropriately altered.

Preferably the control system also has the facility to increase the current in a weld cycle if bridge rupturing has not occurred in a specified time. This facility to be able to increase the current acts as a fallback to ensure that that detachment occurs within the specified parameters.

The parameters of the control system, including the pulse parameters, the threshold size of the droplet, the current clamp value during the short circuit, will vary depending on the parameters of the welding system, such as the composition of the shielding gas, the thickness of the wire, and characteristics of the power source. Optimum values for these parameters in any situation can be established through experience and/or through use of adaptive techniques where the weld quality is calculated over successive cycles of the welding process. As an example, however, the range of current pulse amplitudes will typically be in the order of 200 to 400 amps with the pulse width duration being in the range of 0.5 to 3.0 msec. The short circuit clamping range may vary significantly depending on the arcing current and the work to tip distance. The clamping level may vary from 25 to 200 amps, but preferably is in the range of 50 to 150 amps.

Preferably the droplet diameter range is in the order of 1.2 to 2.5 mm in diameter assuming a spherical droplet. Within this range, the current clamp levels is preferably between 50 to 150 amps for argon based gasses and 75 to 200 amps for $CO_2$ gas shielding.

Preferably the short circuit time is in the range of 2.0 to 4.8 msec. If the duration exceeds between 5 to 7 msec, the current clamp is preferably released for the individual short circuit and then returned to the pre-set value immediately after the short circuit has cleared. Preferably this occurs at 5.0 msec for an argon+20% $CO_2$ gas shield and at 6.0 msec for a $CO_2$ gas shield.

Preferably the arcing time is between 10 msec and 20 msec. If the upper value is exceeded, particularly in the case of $CO_2$ shielding, the current may be reduced to force the next short circuit to occur.

In yet a further aspect, the present invention relates to a power supply which incorporates a control system according to any form as described above. The power supply is characterised in that it incorporates a control system which is operative to control the output of the power source such that, in a welding system in which the power source is connected, the power source is operative to condition the welding system to form a molten droplet during an arcing phase of the welding cycle which is within a predetermined threshold size range.

BRIEF DESCRIPTION OF THE DRAWINGS

It is convenient to hereinafter describe embodiments of the present invention with reference to the accompanying drawings. It is to be understood that the particularity of these drawings and the related description does not supersede the preceding broad description of the invention.

In the drawings.

DETAILED DESCRIPTION

Figure 1:
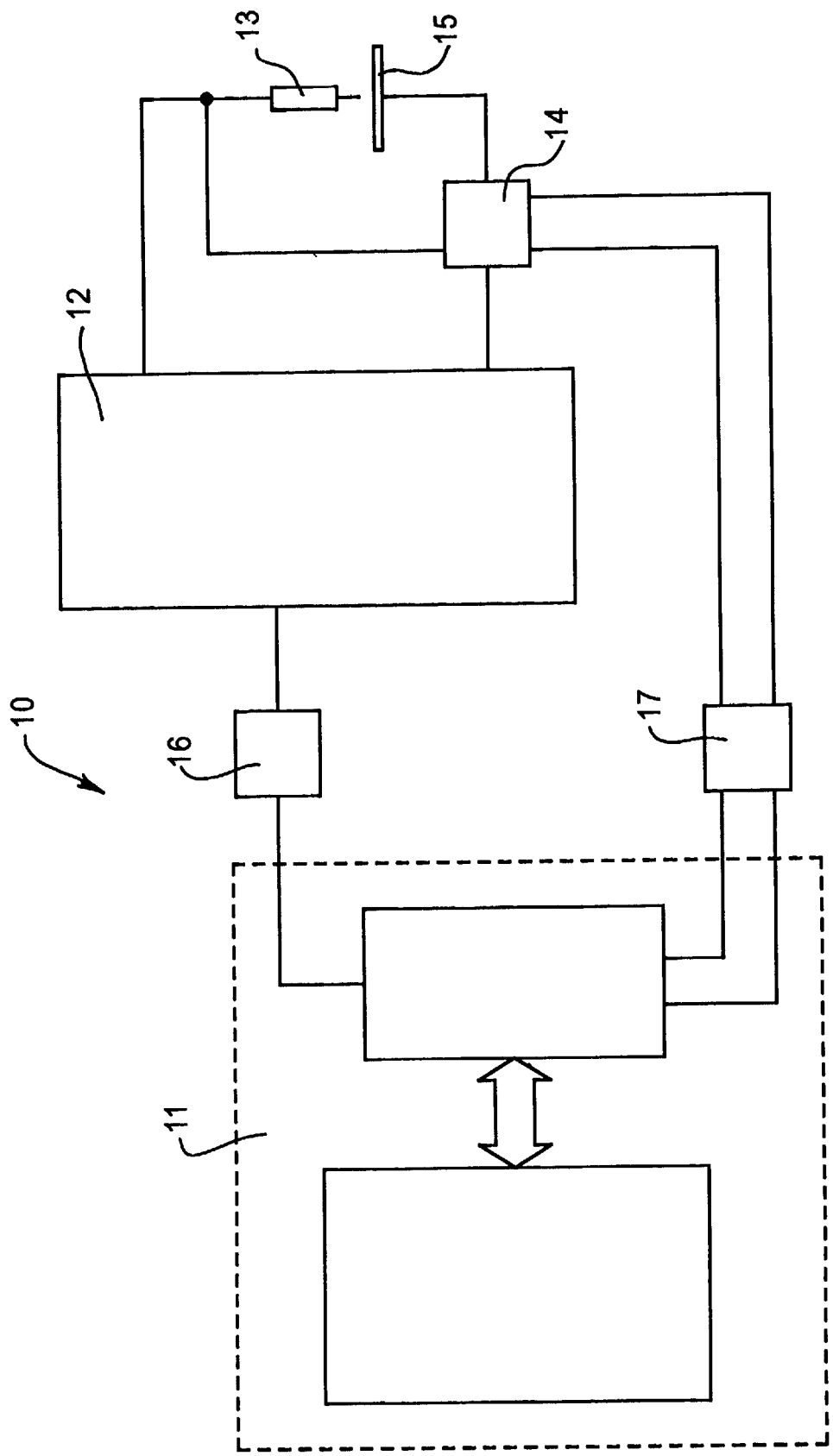
FIG. 1 is a block diagram of a welding system.
Figure 2:
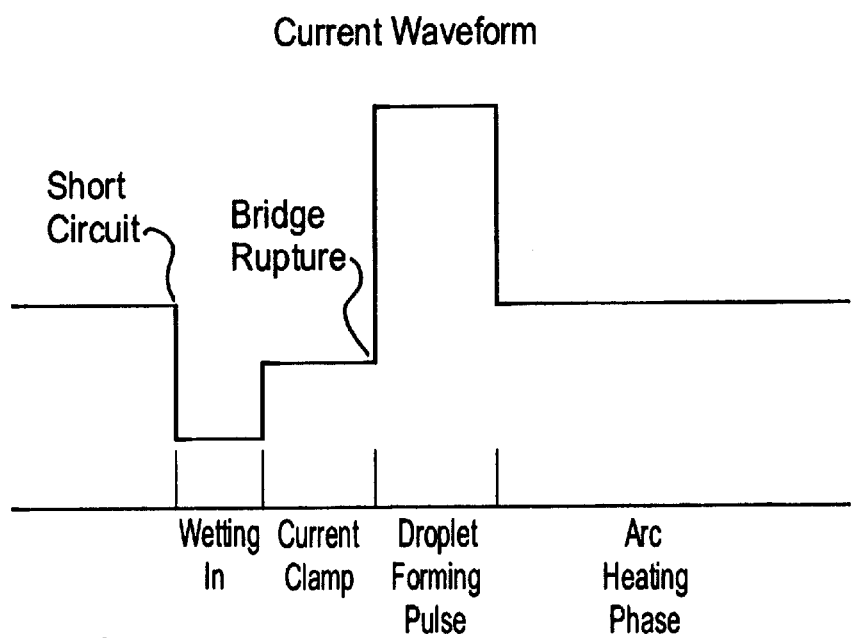
FIG. 2 is a current graph illustrating a transient current waveform during the welding cycle of the welding system of FIG. 1.

Turning firstly to FIG. 1, a welding system is illustrated which incorporates a control system arranged to control the current during welding to produce a current waveform as illustrated in FIG. 2. The welding is operative in the short circuit (or dip) transfer mode and the control system is operative to minimise weld spatter during the short circuit phase of the welding cycle.

The welding system 10 includes a control unit 11, welding power source 12 which is connected to a welding torch 13. A feedback unit 14 is connected between the workpiece 15 and the power source 12. The feedback unit 14 supplies voltage and current feedback to the control unit 11. The system also includes a signal reference 16 and feedback isolation unit 17 to provide integrity to the welding system.

In the illustrated embodiment, the control unit 11 comprises a computer interfaced with a digital signal processor (DSP). The DSP is used to control the current reference signal applied to the welding power source as well as monitoring in real time the voltage and current feedback, One version of this device utilises a Texas instruments TMS320DSP processor and a 233 MHz Celeron CPU. Control of the DSP is through custom developed software especially written for the welding application. The control unit does not need to comprise a computer with a compatible DSP, all the functions of the control computer and the DSP can be performed using a microprocessor or electronic hardware system.

The power source 12 is operated in constant current mode. It is necessary that the power source has current limiting capability. A reference from the control unit determines the output current required for various stages of the welding process. The power source should have a continuously variable output, while electronic power regulation using primary-rectifier inverter circuitry is preferred. The response rate of the power source should be at least 400 A/ms at the output terminals. These requirements are found on many commercially available welding power sources, such as Cigweld GMS 600 and Thermadyne Power Master 500.

In operation, the DSP is designed to sample conditions every 40 $\mu$sec. During sampling, electronic circuitry interrupts the DSP programme. The DSP then registers the feedback voltage (and current if required), conducts processing steps and issues an update current reference signal to the power source. The current reference signal controls the current level outputted by the power source which is operating under constant current mode. The DSP also has the capacity to update a wire feed reference signal to provide the facility to change wire feed rates. However in a preferred form, this signal remains fixed.

The DSP is able to register transitions in the welding cycle between the arcing and short circuit phases from the feedback voltage as on short circuiting, the voltage level will drop significantly whereas following bridge rupture, the voltage levels will increase.

By being able to know the state of the welding cycle, and the time of each sample, the DSP is able to calculate the duration of various steps in the processing cycle, such as the duration of an arcing pulse, the length of the arcing and short circuit phases, using the sampling cycles as a counter. These calculations can then be incorporated into the processing steps to thereby allow effective operation of the control system. In addition, in view of the fast sampling times of the DSP, the control system has the facility to change the welding conditions during a welding cycle effectively in real time.

The welding system, under operation of the control system 11, is operative to provide a current waveform in the welding cycle as schematically illustrated in FIG. 2. In the system, the molten droplet which is formed at the electrode tip is grown by a pulse prior to short circuit occurring. During the short circuit the current is maintained at or below a clamped level. With reference to the waveform of FIG. 2, prior to the short circuit the current is maintained at a level that will produce the required heat input to ensure that the droplet remains molten and workpiece plate fusion occurs, The current is reduced after the short circuit is detected to assist the wetting in of the molten droplet. Once the wetting in period is complete, the current is increased to its clamp level where it is held until the molten droplet material that forms a bridge between the electrode and the workpiece ruptures. On detecting the rupture, a current pulse is applied to grow the droplet to its threshold size. After the pulse, the current is then maintained at the required level until the short circuit occurs.

The operating parameters of the system 10 are as follows:

Droplet Dimensions and Current Clamp Levels—The droplet diameter range for satisfactory performance is 1.2 to 2.5 mm diameter, assuming a spherical droplet. This enables a preferred range of current clamp levels of 50 to 150 amps for argon based gasses and 75 to 200 amps for $CO_2$ gas shielding.

Figure 3:
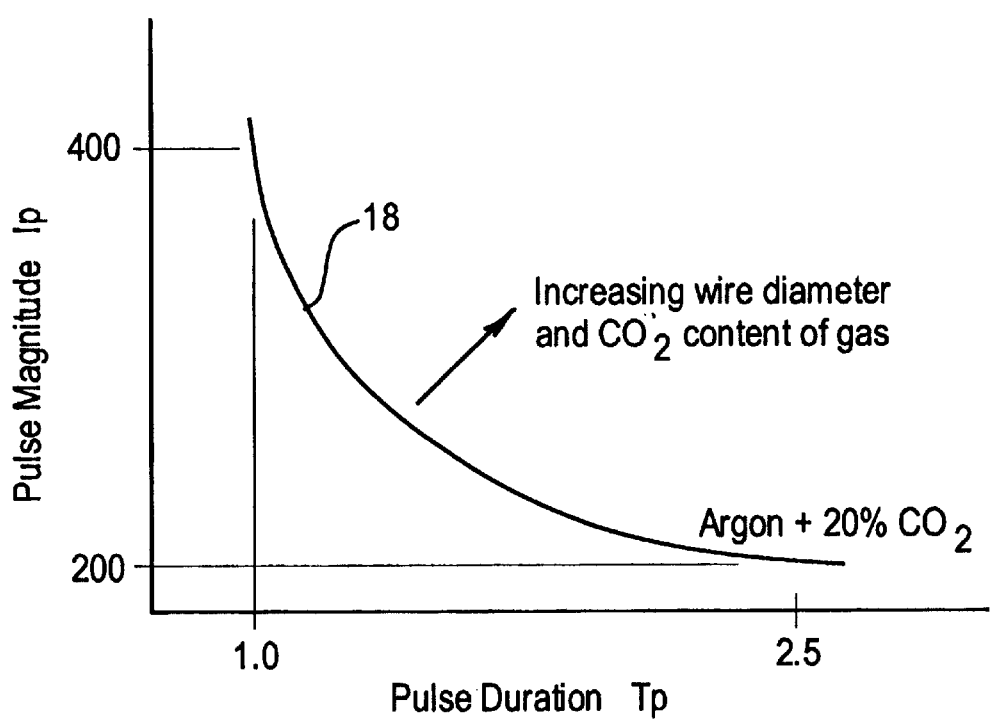
FIG. 3 is a graph illustrating the pulse parameters of the current wave form illustrated in FIG. 2.

Pulse Range—The pulse parameters depend on wire diameter but are generally as shown in FIG. 3, where the pulse parameters should fall inside the limiting curve 18. As indicated in FIG. 3, the line extends outwardly on increasing wire diameter and with increasing $CO_2$ content of gas. The range of current pulse amplitude is in the order of 200 to 400 amps with a pulse width duration range between 0.5 to 3.0 msec.

Short Circuit Time—The short circuit time should be between 2.0 to 4.8 msec. If the duration exceeds 5.0 msec for argon based gasses, the current clamp is released for the individual short circuit and then returned to the pre-set value immediately after the short circuit is cleared. For $CO_2$, the clamp should be released after 6.0 msec, Arc Time—When using $CO_2$ the maximum arcing time may be set to 20 msec and the current may be reduced to between 10 and 20 amps when this time is exceeded to prevent excessive droplet growth and force the next short circuit.

Control System—The control system may operate in three (3) separate modes or in combinations of these modes:
(1) Normal Mode. In this mode the current pulse and clamp level are predetermined by the individual controls or computed to match the optimum procedures previously established for a given mean current or application;
(2) Corrective Mode. If the short circuit is extended beyond the pre-set limits as set by the short circuit time, the control releases the current clamp and allows full short circuit current to flow, the maximum arcing time for $CO_2$ is preset to 20 msec after which the current is reduced to between 10 to 20 amps to force the next short circuit; and
(3) Adaptive Mode. In this mode, the control circuit modifies the clamping level continuously to establish a minimum achievable current clamp within the short circuit pre-set limits as set out above. The pulse parameter is modified to establish whether a lower clamp level is possible by increasing the pulse energy within the limits defined by the pulse range.

A control system according to the above has been shown to reduce spatter in $CO_2$ and argon based gases. The weld bead surface is very smooth and the profile of the weld is excellent.

It is convenient to hereinafter describe the invention with reference to the following examples. It is to be appreciated that the particularity of the examples is to be understood as not limiting the scope of the invention.

The following two examples illustrate a set of suitable operating parameters when using different shielding gases. In both examples the wire electrode used was a Cigweld Autocraft LW 1–6, 0.9 mm.

EXAMPLE 1

Argon+20% $CO_2$ Shielding Gas

A welding system is set up with the following operating parameters:

Arc Pulse Ip=275 A

Pulse Width=1.8 mS

Arcing Current=80 A

Travel Speed=382 mm/min

Wire Feed=5.25 m/min.

The welding system exhibits the following characteristics in use:

Stability=0.73

Dip Freq=53 Hz

Imean=104.3 A.

EXAMPLE 2

$CO_2$ Shielding Gas

A welding system is set up with the following operating parameters:

Arc Pulse Ip=300 A

Pulse Width=2.2 mS

Arcing Current=60 A

Travel Speed=335 mm/min

Wire Feed=4.75 m/min

The welding system exhibits the following characteristics in use:

Stability=0.8

Dip Freq=64 Hz

Imean=91.6 A

Figure 4:
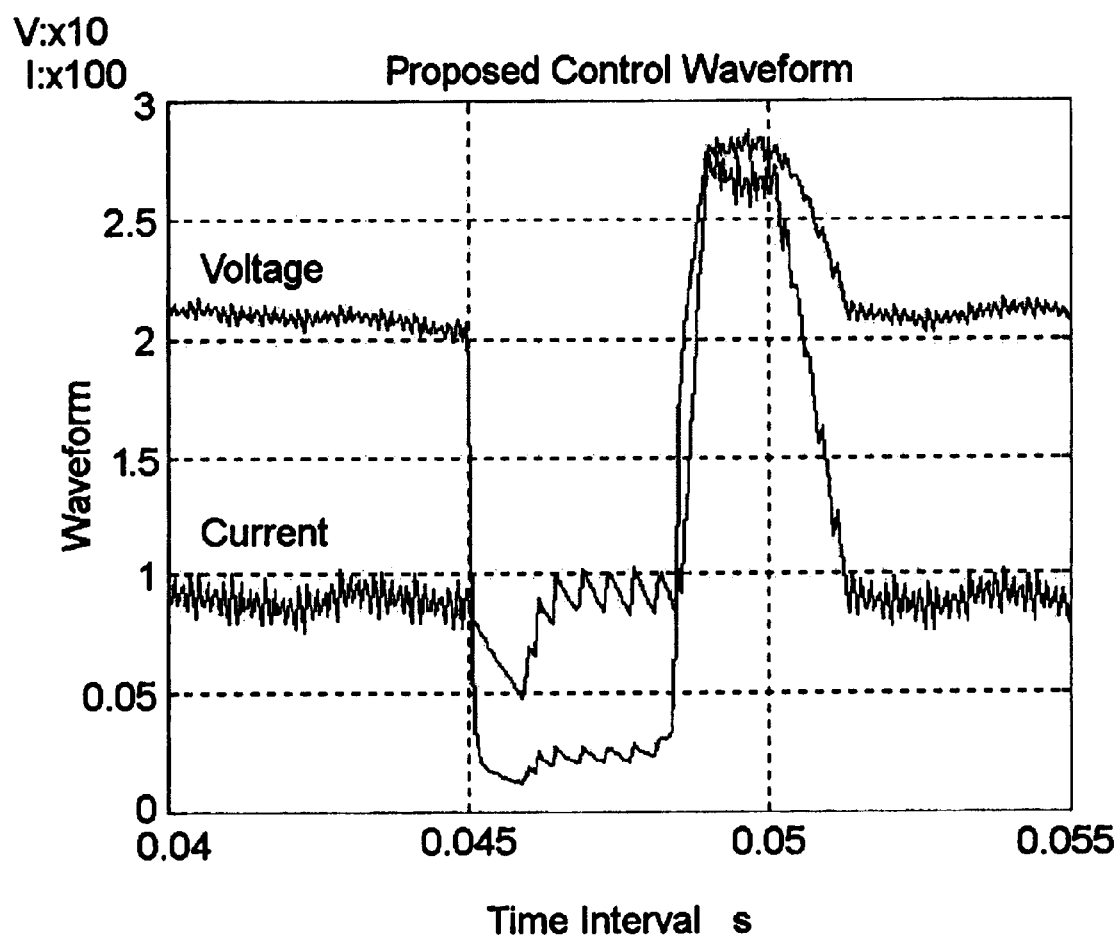
FIG. 4 is a graph depicting voltage and current waveforms obtained under test conditions.

Test welds produced by the welding system in the two above examples are found to be of comparable quality to welds produced by a welding system using a sophisticated power source. FIG. 4 illustrates typical voltage and current waveforms for one welding cycle of the welding system in the above two examples.

It is to be appreciated that various alterations or additions may be made to the parts previously described without departing from the spirit or ambit of the invention.

What is claimed is:

1. A method of controlling an arc welding system operating in the dip transfer mode over a plurality of welding cycles, the welding system including a power source and a consumable electrode which in use is operative to be advanced into contact with a workpiece, the welding system being operative to create a welding circuit which is energised by said power source and wherein the welding cycle comprising an arcing phase where the electrode is spaced from said workpiece and an arc is generated across said space, the arc being operative to form a molten droplet on the end of the electrode, and a short circuit phase where the electrode is in contact with said workpiece, the welding cycle changeing from the arcing phase to the short circuit phase on contact of the molten droplet with the workpiece, and changing from the short circuit phase to the arcing phase after rupturing of a bridge of molten material formed between said electrode and said workpiece, the method including the steps of:

(i) conditioning the welding system to form a molten droplet on the electrode end during the arcing phase which is within a predetermined threshold size range so that bridge rupturing can occur during the short circuit phase without requiring high current during the short circuit; and (ii) controlling the current output from the power source during the short circuit phase wherein in response to the detection of a short circuit, the current output is maintained at or below a first level both before and during bridge rupturing for at least the majority of the welding cycles, said first level being such that said current output will not induce excessive spatter on bridge rupturing.

2. A method according to claim 1, wherein the welding system is conditioned so that the diameter of the molten droplet in the threshold size range is between 1.2 mm to 2.5 mm.

3. A method according to claim 1, wherein the conditioning of the welding system causes the power source to apply a current pulse during the arcing phase operative to increase the size of the molten droplet formed on the electrode end.

4. A method according to claim 3, wherein the amplitude of the current pulse is within the range of 200 amps to 400 amps.

5. A method according to claim 3, wherein the duration of the current pulse is within the range of 0.5 msec to 3 msec.

6. A method according to claim 1, wherein the welding system includes shielding gas incorporating argon and the first current level is within the range of 50 amps to 150 amps.

7. A method according to claim 1, wherein the welding system includes shielding gas incorporating $CO_2$ and the first current level is within the range of 75 amps to 200 amps.

8. A method according to claim 1, including the step of:

(i) measuring the duration of the short circuit phase; and (ii) varying the conditioning of the welding system for a subsequent welding cycle if the short circuit phase falls outside a predetermined range.

9. A method according to claim 8, where the duration of the short circuit phase is in the range of 2.0 msec to 4.8 msec.

10. A method according to claim 1, further including the steps of:

(i) measuring the duration of the short circuit phase of a welding cycle; and (ii) allowing the current during the short circuit phase to increase above the first level in a welding cycle when the duration of short circuit phase of that welding cycle lasts more than a predetermined period.

11. A method according to claim 10, wherein the predetermined period is between 5 msec to 7 msec.

12. A method according to claim 1, further including the step of:

(i) measuring the length of the arcing phase of a welding cycle; and (ii) reducing the current during that arcing phase when the arcing phase lasts more than a predetermined period.

13. A method according to claim 12, wherein the predetermined period is between 10 msec and 20 msec.

14. A method according to claim 1, wherein in response to the detection of a short circuit, the current output is initially maintained at or below a second level which is less than said first level to assist in wetting in of the molten droplet.

15. A method of controlling an arc welding system operating in the dip transfer mode, the welding system including a power source and a consumable electrode which in use is operative to be advanced into contact with a workpiece, the welding system being operative to create a welding circuit which is energised by said power source and which has a welding cycle comprising an arcing phase where the electrode is spaced from said workpiece and an arc is generated across said space, the arc being operative to form a molten droplet on the end of the electrode, and a short circuit phase where the electrode is in contact with said workpiece, the welding cycle changing from the arcing phase to the short circuit phase on contact of the molten droplet with the workpiece, and changing from the short circuit phase to the arcing phase after rupturing of a bridge of molten material formed between said electrode and said workpiece, the method including the steps of:

(i) conditioning the welding system to form a molten droplet on the electrode end during the arcing phase which is within a predetermined threshold size range so that bridge rupturing can occur during the short circuit phase without requiring high current during the short circuit;

(ii) estimating the size of the molten droplet forming on the electrode end in real time during the welding cycle; and (iii) controlling the current output from the power source during the short circuit phase.

16. A method according to claim 15, wherein the droplet size is estimated by calculating the length of the electrode which has become molten during an arcing phase, and estimating the droplet diameter by converting the volume of the length of molten electrode into a sphere.

17. A method according to claim 16, wherein the length of the electrode which has become molten during the arcing phase is calculated as follows:

estimating the contact tip to workpiece distance (CTWD) by measuring the minimum short circuit resistance during the short circuit, the duration of the short circuit, and applying two correction factors to estimate CTWD:

$$CTWD = aR_{sc\_min} \times \frac{b}{T_{sc}} \quad \text{Units:meters}$$

where b is the time-dependent correction factor, and a is the resistance-dependent correction factor;

calculating the transit time, which is the time taken for an element of material in the electrode to travel from contact tip to workpiece by the equation:

$$T_{transit} = \frac{CTWD}{\text{Wire Feed Speed}} \quad \text{Units:seconds}$$

estimating the amount of electrode preheating, which affects the rate at which material at the electrode tip melts, by the action integral;

$$\text{Action} = \int_{t-T_{transit}}^{t} i^2(t)dt \quad \text{Units:AAs}$$

where t is the present time; calculating the instantaneous melting rate of the electrode by the equation:

$$MR(t) = \frac{\alpha}{1 - \beta \times \text{Action}} \quad \text{Units:meters/sec}$$

where α and β are the arcing an resistive melting rate constants of the electrode being used; and integrating the melting rate over the duration of the arcing period to calculate the length of electrode L(t) which has been molten during the arcing:

$$\Delta L(t) = \int_{t=\text{start of arc}}^{t} MR(t)dt \quad \text{Units:meters}.$$

18. A method according to claim 15, further including the step of comparing the estimation of the droplet size to the predetermined threshold size range and varying the conditioning of the welding system during the arcing phase in response to the comparison if the estimated size falls outside the predetermined range.

19. A method according to claim 15, wherein in response to the detection of a short circuit, the current output is maintained at or below a first level both before and during bridge rupturing for at least the majority of the welding cycles, said first level being such that said current output will not induce excessive spatter on bridge rupturing.

20. A method of controlling an arc welding system operating in the dip transfer mode, the welding system including a power source and a consumable electrode which in use is operative to be advanced into contact with a workpiece, the welding system being operative to create a welding circuit which is energised by said power source and which has a welding cycle comprising an arcing phase where the electrode is spaced from said workpiece and an arc is generated across said space, the arc being operative to form a molten droplet on the end of the electrode, and a short circuit phase where the electrode is in contact with said workpiece, the welding cycle changing from the arcing phase to the short circuit phase to the arcing phase after rupturing of a bridge of molten material formed between said electrode and said workpiece, the method including the steps of:

(i) conditioning the welding system to form a molten droplet on the electrode end during the arcing phase which is within a predetermined threshold size range so that bridge rupturing can occur during the short circuit phase without requiring high current during the short circuit;

(ii) estimating the size of the molten droplet formed on the electrode end during an arcing phase by measuring the elapsed time of each welding cycle and by estimating the droplet size assuming the electrode is advanced at a constant rate; and (iii) controlling the current output from the power source during the short circuit phase.

21. A method according to claim 20, further including the steps of:

(i) comparing the estimation of the droplet size to the predetermined threshold size range: and (ii) varying the conditioning of the welding system for a subsequent welding cycle if the estimated size falls outside the predetermined range.

22. A method according to claim 20, wherein in response to the detection of a short circuit, the current output is maintained at or below a first level both before and during bridge rupturing for at least the majority of the welding cycles, said first level being such that said current output will not induce excessive spatter on bridge rupturing.

23. A system for controlling an arc welding system operating in the dip transfer mode over a plurality of welding cycles, the welding system including a power source and a consumable electrode which in use is operative to be advanced into contact with a workpiece, the welding system being operative to create a welding circuit which is energised by said power source and wherein the welding cycle comprising an arcing phase where the electrode is spaced from said workpiece and an arc is generated in said space, the arc being operative to form a molten droplet on the end of the electrode, and a short circuit phase where the electrode is in contact with said workpiece, the welding cycle changing from the arcing phase to the short circuit phase on contact of the molten droplet with the workpiece, and changing from the short circuit phase to the arcing phase after rupturing of a bridge of molten material formed between said electrode and said workpiece, the control systems including:

(i) conditioning means operative to condition the welding system to form a molten droplet on the electrode end during the arcing phase which is within a predetermined threshold size range so that bridge rupturing can occur during the short circuit phase without requiring high current during the short circuit; and (ii) current control means operative to control the current output from the power source during the short circuit phase wherein in response to the detection of a short circuit, the current output is maintained at or below a first level both before and during bridge rupturing for at least the majority of the welding cycles, said first level being such that said current output will not induce excessive spatter on bridge rupturing.

24. A control system according to claim 23, wherein the conditioning means is operative so that the diameter of the molten droplet in the threshold size range is between 1.2 mm to 2.5 mm.

25. A control system according to claim 23, wherein the conditioning means is operative to cause the power source to apply a current pulse during the arcing phase to increase the size of the molten droplet formed on the electrode end.

26. A control system according to claim 25, wherein the amplitude of the current pulse is within the range of 200 amps to 400 amps.

27. A control system according to claim 25, wherein the duration of the current pulse is within the range of 0.5 msec to 3 msec.

28. A control system according to claim 23, wherein the welding system includes $CO_2$ shielding gas and the current control means is operative to maintain the current at or below a level within the range of 75 amps to 200 amps.

29. A control system according to claim 23, wherein the welding system includes shielding gas incorporating argon and the current control means is operative to maintain the current at or below a level within the range of 50 amps to 150 amps.

30. A control system according to claim 23, further including measuring means to measure the duration of the short circuit phase, and adjustment means to vary the conditioning of the welding system for a subsequent welding system if the short circuit phase falls outside a predetermined range.

31. A control system according to claim 30, where the duration of the short circuit phase is in the range of 2.0 msec to 4.8 msec.

32. A control system according to claim 23, further including measuring means operative to measure the length of the short circuit phase of a welding cycle and wherein the current control means is operative to allow the current during the short circuit phase to increase above the first level in a welding cycle when the duration of the short circuit phase of that welding cycle lasts more than a predetermined period.

33. A control system according to claim 32, wherein the predetermined period is between 5 msec to 7 msec.

34. A control system according to claim 23, further including measuring means operative to measure the length of the arcing phase of a welding cycle and wherein the current control means is operative to reduce the current during arcing phase when the arcing phase lasts more than a predetermined period.

35. A control system according to claim 34, wherein the predetermined period is between 10 msec and 20 msec.

36. A system for controlling an arc welding system operating in the dip transfer mode, the welding system including a power source and a consumable electrode which in use is operative to be advanced into contact with a workpiece, the welding system being operative to create a welding circuit which is energised by said power source and which has a welding cycle comprising an arcing phase where the electrode is spaced from said workpiece and an arc is generated in said space, the arc being operative to form a molten droplet on the end of the electrode, and a short circuit phase where the electrode is in contact with said workpiece, the welding cycle changing from the arcing phase to the short circuit phase to the arcing phase after rupturing of a bridge of molten material formed between said electrode and said workpiece, the control systems including:
(i) conditioning means operative to condition the welding system to form a molten droplet on the electrode end during the arcing phase which is within a predetermined threshold size range so that bridge rupturing can occur during the short circuit phase without requiring high current during the short circuit;
(ii) estimating means operative to estimate the size of the molten droplet forming on the electrode end in real time during the welding cycle; and
(iii) current control means operative to control the current output from the power source during the short circuit phase.

37. A control system according to claim 36, wherein the estimating means is operative to estimate the droplet size by calculating the length of the electrode which has become molten during an arcing phase, and estimating the droplet diameter by converting the volume of the length of molten electrode into a sphere.

38. A control system according to claim 37, wherein the estimating means calculates the length of the electrode which has become molten during the arcing phase as follows:
estimating the contact tip to workpiece distance (CTWD) by measuring the minimum short circuit resistance during the short circuit, the duration of the short circuit, and applying two correction factors to estimate CTWD:

$$CTWD = a \frac{R_{sc\_min} \times b}{T_{sc}} \quad \text{Units:meters}$$

where b is time-dependent correction factor, and a is the resistance-dependent correction factor;
calculating the transit time, which is the time taken for an element of material in the electrode to travel from contact tip to workpiece by the equation:

$$T_{transit} = \frac{CTWD}{\text{Wire Feed Speed}} \quad \text{Units:seconds}$$

estimating the amount of electrode preheating, which affects the rate at which material at the electrode tip melts, by the action integral;

$$Action = \int_{t-T_{transit}}^{t} i^2(t)dt \quad \text{Units:AAs}$$

wherein t is the present time;
calculating the instantaneous melting rate of the electrode by the equation:

$$MR(t) = \frac{\alpha}{1 - \beta \times Action} \quad \text{Units:meters/sec}$$

where $\alpha$ and $\beta$ are the arcing and resistive melting rate constants of the electrode being used; and
integrating the melting rate over the duration of the arcing period to calculate the length of electrode L(t) which has been molten during the arcing:

$$\Delta L(t) = \int_{t=\text{start of arc}}^{t} MR(t)dt \quad \text{Units:meters.}$$

39. A control system according to claim 36, further including means to compare the estimation of the droplet size to the predetermined threshold size range, and adjustment means to vary the conditioning of the welding system during the arcing phase in response to the comparison if the estimated size falls outside the predetermined range.

40. A control system according to claim 36, wherein the current control means, in response to the detection of a short circuit, maintains the current output at or below a first level both before and during bridge rupturing for at least the majority of the welding cycles, said first level being such that said current output will not induce excessive spatter on bridge rupturing.

41. A system for controlling an arc welding system operating in the dip transfer mode, the welding system including a power source and a consumable electrode which in use is operative to be advanced into contact with a workpiece, the welding system being operative to create a welding circuit which is energised by said power source and which has a welding cycle comprising an arcing phase where the electrode is spaced from said workpiece and an arc is generated in said space, the arc being operative to form a molten droplet on the end of the electrode, and a short circuit phase where the electrode is in contact with said workpiece, the welding cycle changing from the arcing phase to the short circuit phase on contact of the molten droplet with the workpiece, and changing from the short circuit phase to the arcing phase after rupturing of a bridge of molten material formed between said electrode and said workpiece, the control system including:

(i) conditioning means operative to condition the welding system to form a molten droplet on the electrode end during the arcing phase which is within a predetermined threshold size range so that bridge rupturing can occur during the short circuit phase without requiring high current during the short circuit;

(ii) estimating means operative to estimate the size of the molten droplet formed on the electrode end during an arcing phase, the estimating means including means to measure the elapsed time of each welding cycle, and processing means operative to estimate the droplet size assuming the electrode is advanced at a constant rate; and (iii) current control means operative to control the current output from the power source during the short circuit phase.

42. A control system according to claim 41, further including means to compare the estimation of the droplet size to the predetermined threshold size range and adjustment means to vary the conditioning of the welding system for a subsequent welding cycle in response to the comparison if the estimated size falls outside the predetermined range.

43. A control system according to claim 41, wherein the current control means, in response to the detection of a short circuit, maintains the current output at or below a first level both before and during bridge rupturing for at least the majority of the welding cycles, said first level being such that said current output will not induce excessive spatter on bridge rupturing.

* * * * *